United States Patent
Poarch et al.

(10) Patent No.: US 6,752,088 B2
(45) Date of Patent: Jun. 22, 2004

(54) EATING COUNTER APPARATUS FOR MOBILE VENDING VEHICLE AND SEATING APPARATUS THEREFOR

(76) Inventors: Michael J. Poarch, deceased, late of Redmond, OR (US); Vickie L. Poarch, legal representative, 858 NE. Nickernut Ave., Redmond, OR (US) 97756

( * ) Notice: Subject to any disclaimer, the term of this patent is extended or adjusted under 35 U.S.C. 154(b) by 21 days.

(21) Appl. No.: 10/160,651

(22) Filed: May 30, 2002

(65) Prior Publication Data

US 2002/0180228 A1 Dec. 5, 2002

Related U.S. Application Data

(60) Provisional application No. 60/294,807, filed on May 31, 2001.

(51) Int. Cl.$^7$ ................................................ A47B 23/00
(52) U.S. Cl. ................................................ 108/44
(58) Field of Search ................ 108/44, 48; 297/170, 297/171, 172, 217.1; 280/762; 224/519, 518

(56) References Cited

U.S. PATENT DOCUMENTS

| | | | | |
|---|---|---|---|---|
| 2,771,318 A | | 11/1956 | Jagsch | |
| 4,086,849 A | * | 5/1978 | Simmons | 108/44 |
| 4,757,755 A | * | 7/1988 | Sarten | 108/44 |
| D301,108 S | | 5/1989 | Cohen | |
| 5,329,979 A | * | 7/1994 | Miller et al. | 108/44 |
| 5,649,734 A | * | 7/1997 | Speis | 108/44 |
| 5,950,617 A | * | 9/1999 | Lorenz | 108/44 |
| 6,113,171 A | * | 9/2000 | Stearns | 108/44 |
| 6,250,702 B1 | * | 6/2001 | Eipper | 108/44 |
| 6,314,891 B1 | * | 11/2001 | Larson | 108/44 |

* cited by examiner

Primary Examiner—Jose V. Chen
(74) Attorney, Agent, or Firm—Olson & Olson

(57) ABSTRACT

An eating counter apparatus for mounting to a three or four-wheeled, motorized or pedal-powered vehicle used as at least part of a mobile food vending eatery whereby to utilize the vehicle to provide an eating area for the patrons of the eatery. The eating counter apparatus also may mount a seating apparatus arranged to support seated patrons about the vehicle as they eat at the counter of the eatery vehicle.

12 Claims, 9 Drawing Sheets

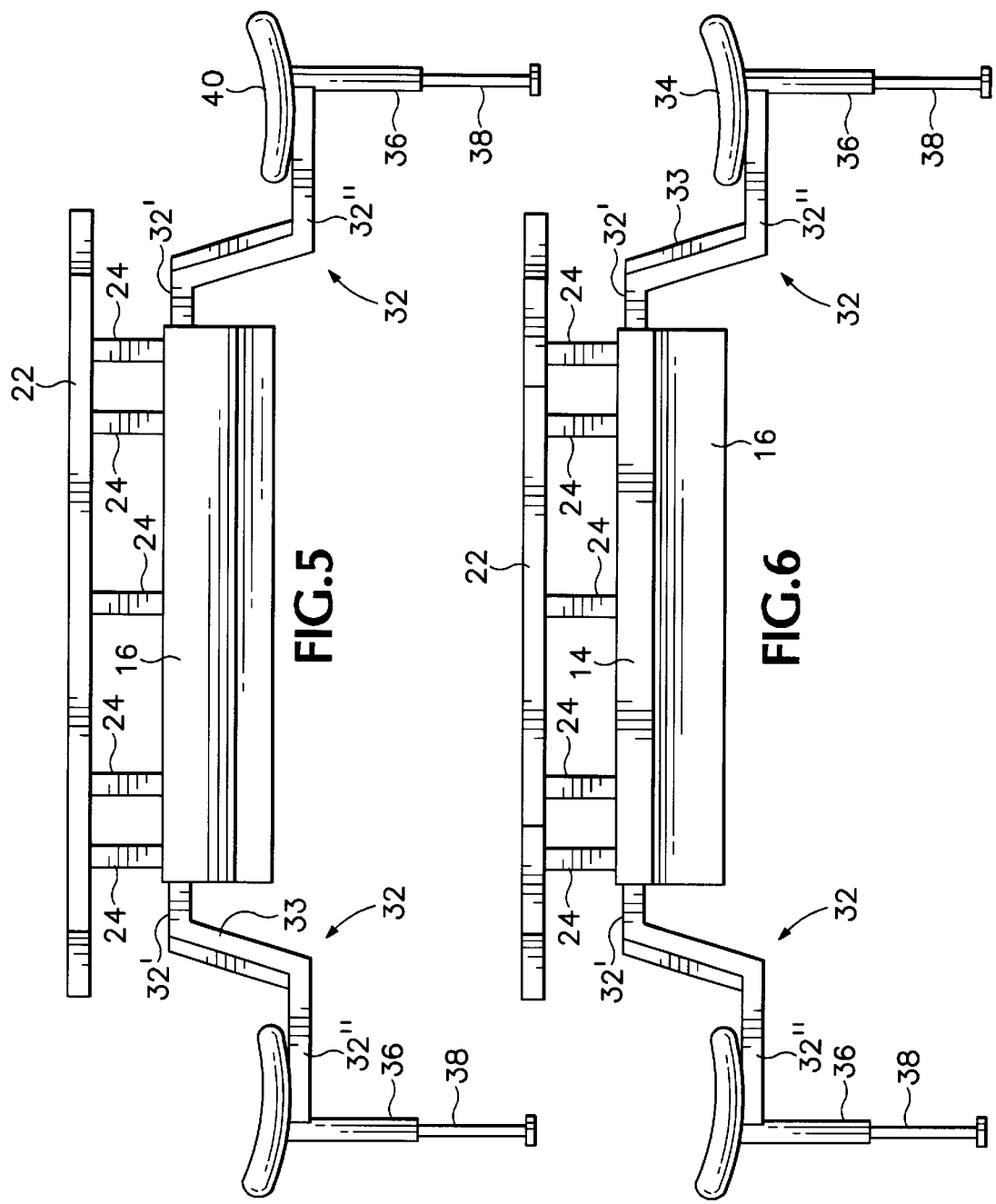

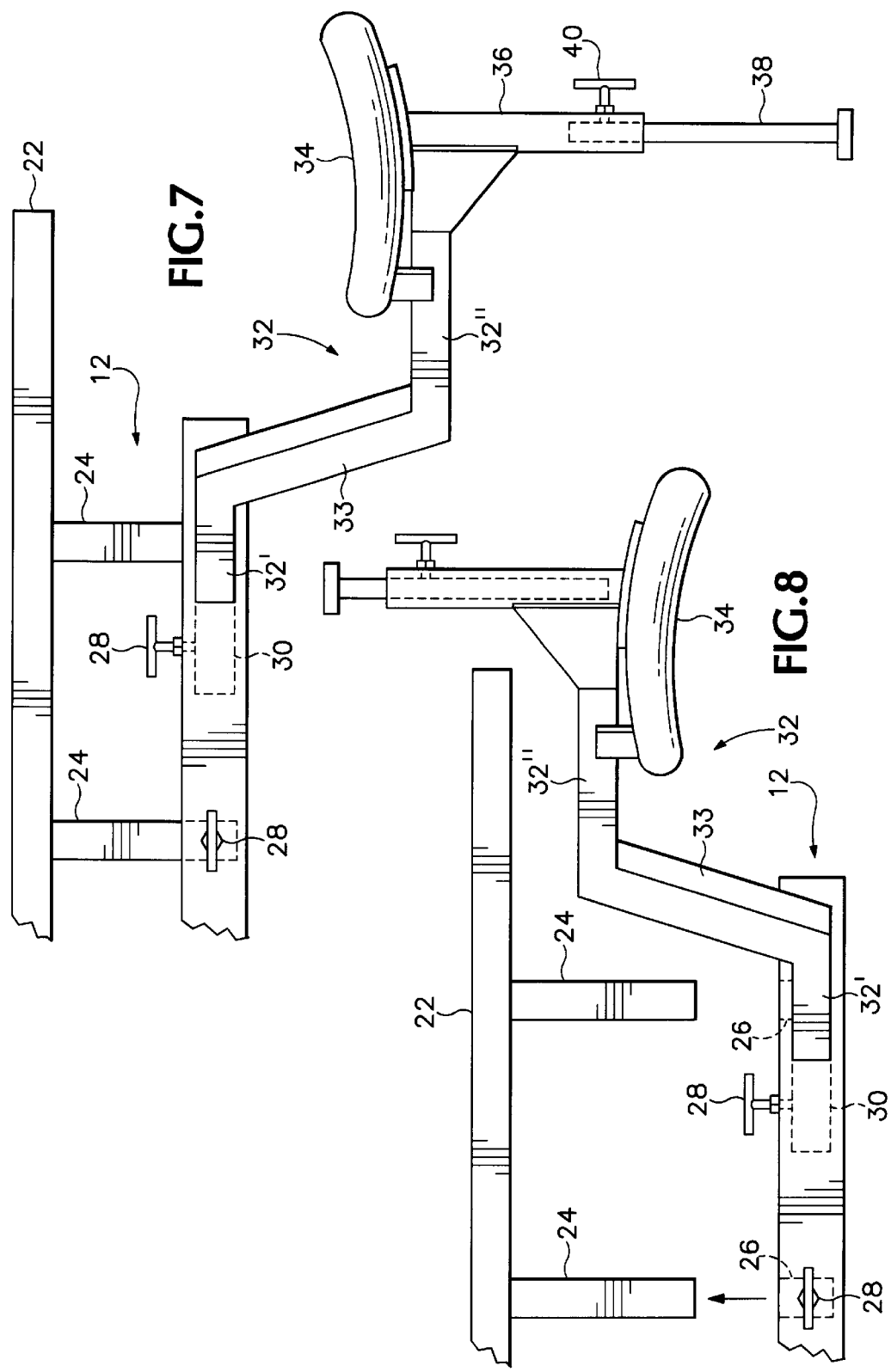

EATING COUNTER APPARATUS FOR MOBILE VENDING VEHICLE AND SEATING APPARATUS THEREFOR

This application claims benefit under 35 U.S.C. 119(e) of the priority filing date of earlier-filed U.S. Provisional application Serial No. 60/294,807, filed May 31, 2001.

BACKGROUND OF THE INVENTION

This invention relates to small three and four-wheeled vehicles such as "three-wheelers and four-wheelers" (both motorized or pedal-powered), larger three-wheeled motorcycles known as "trikes", three and four-wheeled golf cart-type vehicles, and other similar types of small vehicles, and more particularly to an eating counter apparatus, which may itself also include a seating apparatus associated therewith, for mounting on a vehicle whereby mobile food vendors provide a convenient and comfortable eating arrangement for patrons of the mobile establishment.

Becoming ever more popular nowadays are mobile eateries which can be brought to desired locations and setup alongside streets and sidewalks, in parks, outdoor malls, at entertainment events and such where an ever-increasing variety of food products ranging from sandwiches and hot dogs to pastries and pretzels to ice creams and coffees are being offered for sale. Hand-propelled push-cart eateries and specialized bicycle-type arrangements are well-recognized versions of mobile eateries, and most readers will remember three-wheeled bicycles mounting a large insulated box for carrying ice cream or hot dogs to potential patrons about parks, neighborhoods and other similar outdoor areas.

Other than the manually-propelled pushcart type food stands and the single box-mounting pedal vehicles of the early years, mobile food service vehicles otherwise tend to be in the form of expensive, self-contained vans and trucks or large towable trailers such as those shown in U.S. Pat. Nos. 2,771,318 (Jagsch) and Des. 301,108 (Cohen).

SUMMARY OF THE INVENTION

In its basic concept this invention provides a counter apparatus for mounting to the frame of small, motorized or manually pedal-powered three or four-wheeled vehicles, the counter apparatus arranged for support on the vehicle frame to position an eating countertop surface at a predetermined height above the underlying ground surface supporting the vehicle whereby to provide a comfortable and convenient eating surface area for a plurality of people positioned alongside the vehicle.

It is by virtue of the foregoing basic concept that the principal objective of this invention is achieved; namely, the provision of an eating counter apparatus for mounting on small three and four-wheeled vehicles used in a mobile eatery or mobile restaurant whereby to increase the utility and make most advantageous use of the vehicle for the comfort and benefit of the patrons of the mobile establishment.

Another object of this invention is the provision of a counter apparatus of the class described which may be mounted on a small three or four-wheel vehicle to provide an upper, countertop eating surface positioned to accommodate patrons in either a standing condition or a seated condition adjacent the vehicle.

A further object of this invention is the provision of a countertop apparatus of the class described which may include a seating apparatus mounted thereto for supporting seated patrons of the mobile restaurant in seated condition about the periphery of the countertop.

The foregoing and other objects and advantages of the present invention will appear from the following detailed description, taken in connection with the accompanying drawings of preferred embodiments.

BRIEF DESCRIPTION OF THE DRAWINGS

FIG. 5 is a rear elevation of the counter and seating apparatus as viewed from the left in FIG. 3.

FIG. 6 is a front elevation as viewed from the right in FIG. 3.

FIG. 7 is a fragmentary side elevation, on an enlarged scale, of the right portion of the counter and seating apparatus of FIG. 3 illustrating internal detail of the clamp locking arrangements for the seating apparatus in operative condition.

FIG. 8 is a fragmentary side elevation similar to FIG. 7 but showing the seats repositioned into an inverted, transport condition supported on the counter base frame.

DESCRIPTION OF THE PREFERRED EMBODIMENTS

Figure 1:
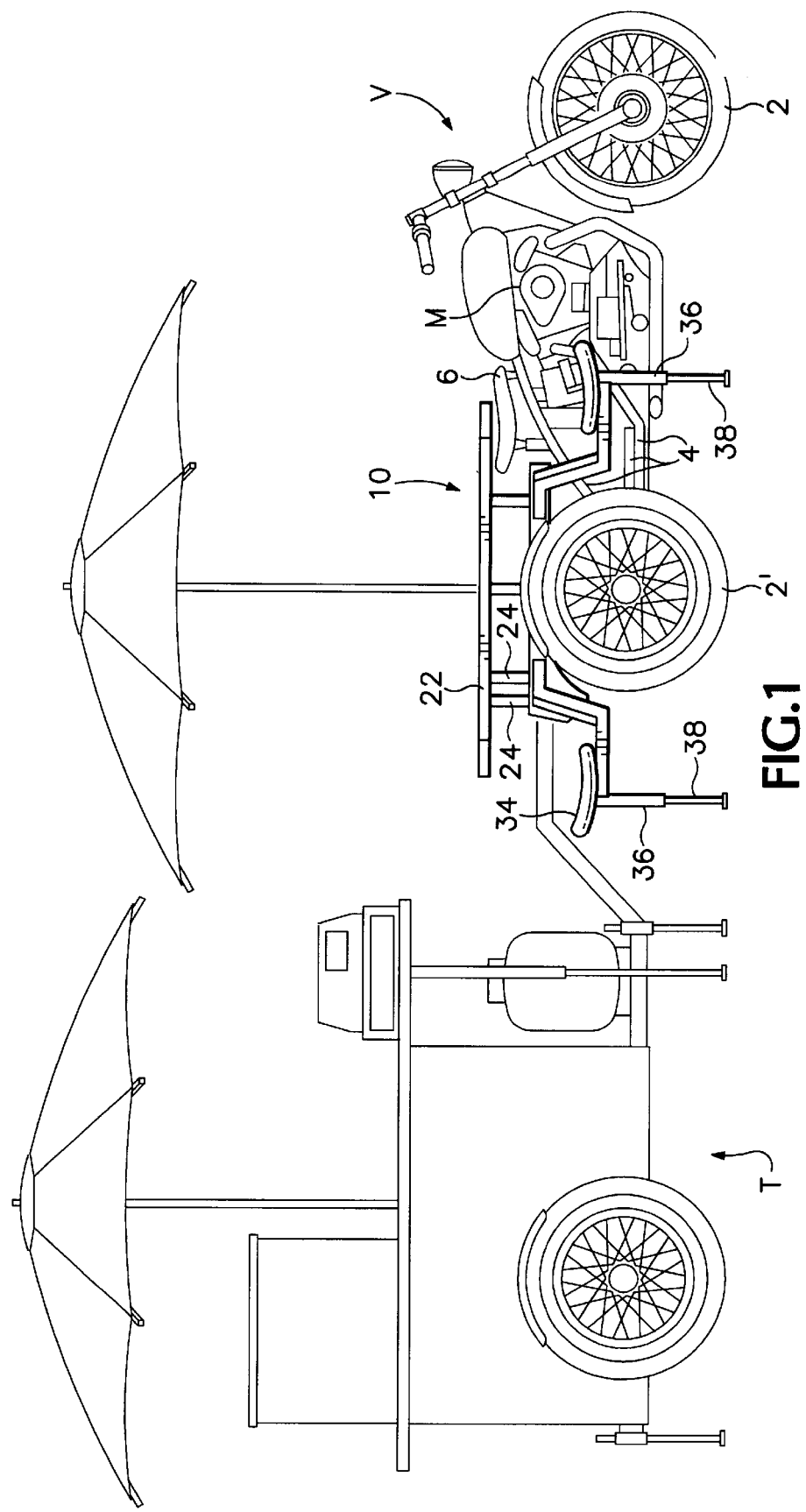
FIG. 1 is a side elevation of a preferred embodiment of the counter and seating apparatus of this invention mounted on a three-wheeled motorcycle vehicle having a food vending trailer attached thereto, the entire combination forming one form of a mobile restaurant shown in a set-up condition for servicing patrons.
Figure 2:
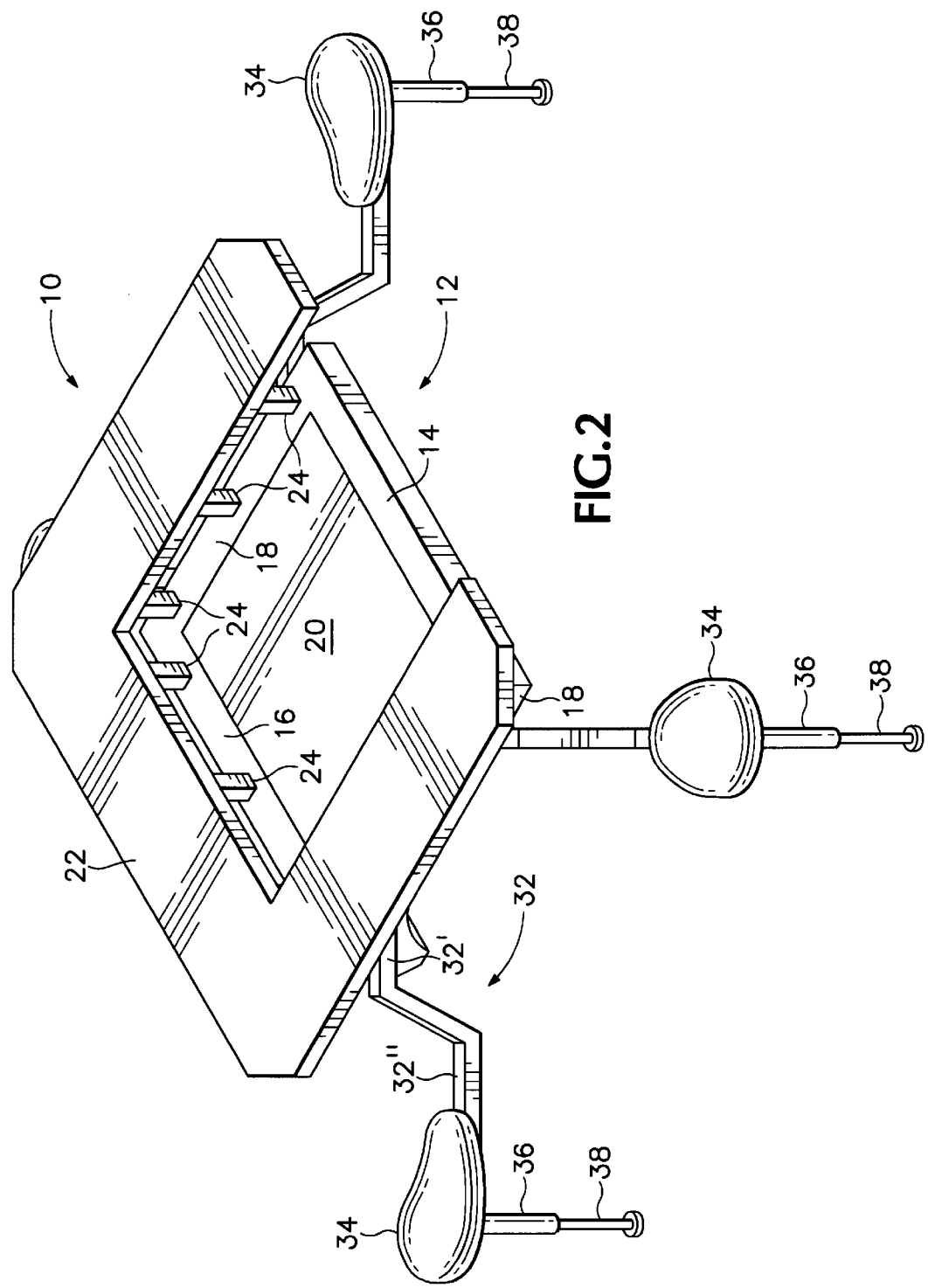
FIG. 2 is a perspective view of only the counter and seating apparatus shown in FIG. 1.
Figure 3:
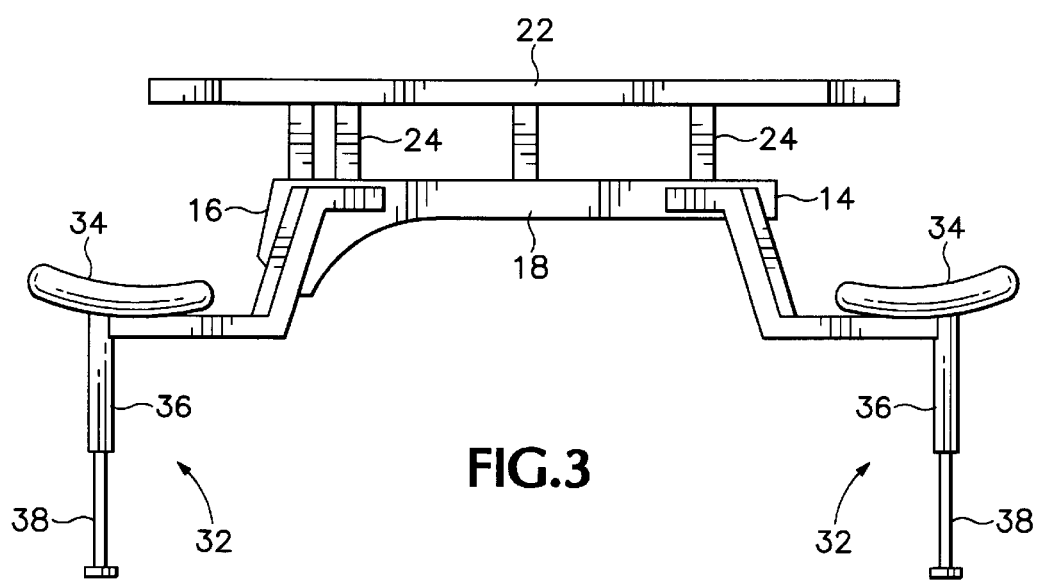
FIG. 3 is a side elevation of the counter and seating apparatus as viewed from the lower left in FIG. 2.
Figure 4:
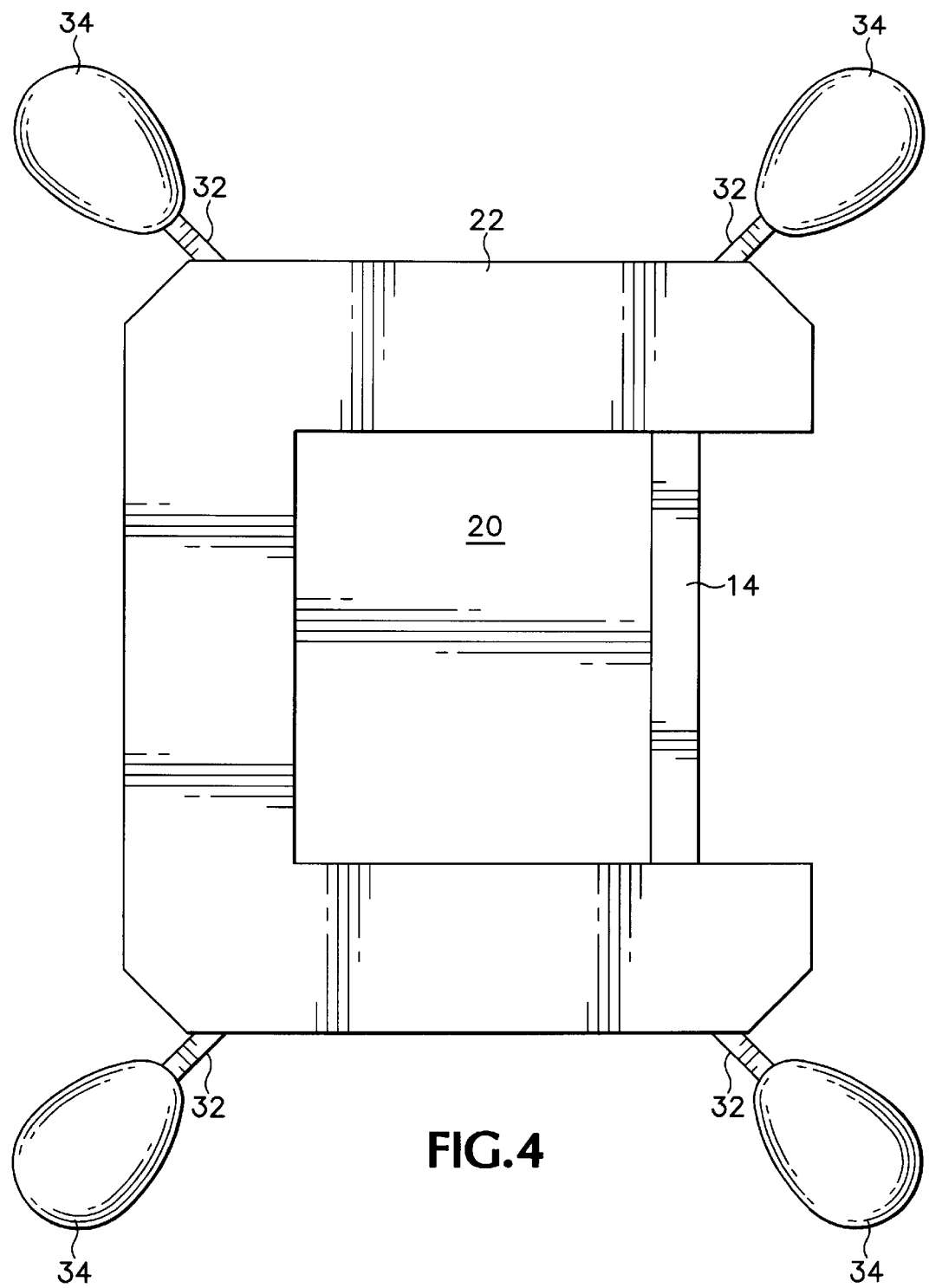
FIG. 4 is a top plan view as seen from the top in FIG. 3.

An overall view of a mobile restaurant or eatery set up in operative condition is illustrated in FIG. 1. The counter apparatus of this invention is shown mounted on the rear end portion of a three-wheeled motorcycle known as a "trike" in the motorcycle art, with a seating apparatus of the preferred embodiment of the invention mounted on a counter which is mounted to the vehicle base support member. Although a full-size, three-wheeled motorcycle vehicle is illustrated herein, it is to be understood that the vehicle may alternatively comprise other motorized vehicles such as all-terrain vehicles (ATV's) known as "3-wheelers and 4-wheelers", golf cart-type vehicles, or, if desired, three and four-wheeled, pedal-powered bicycles which are also well known in the bicycle industry. All of these types of vehicles are known to be capable of engaging and towing small food cart trailers T such as the one illustrated in FIG. 1 of the drawings that forms the main, food preparation and service component of the mobile eatery embodied in FIG. 1.

Small vehicles V of the general class identified herein all typically include at least one front wheel 2, which is usually, although not necessarily, the steerable wheel of the vehicle, and a pair of laterally spaced-apart rear wheels 2' which are usually connected to a source of operator-controlled drive power by which the vehicle is propelled along an underlying ground surface. The front and rear wheels are supported on an elongated vehicle frame assembly 4 which mounts an operator's seat 6 intermediate the front and rear wheels. The seated operator controls the operation of the vehicle as is well known, including control of frame-supported drive means for propelling the vehicle. This drive means may comprise a frame-mounted motor M or a frame-mounted pedal arrangement (not shown) powered by the seated operator, as is well known in the three and four wheel bicycle art.

Figure 9:
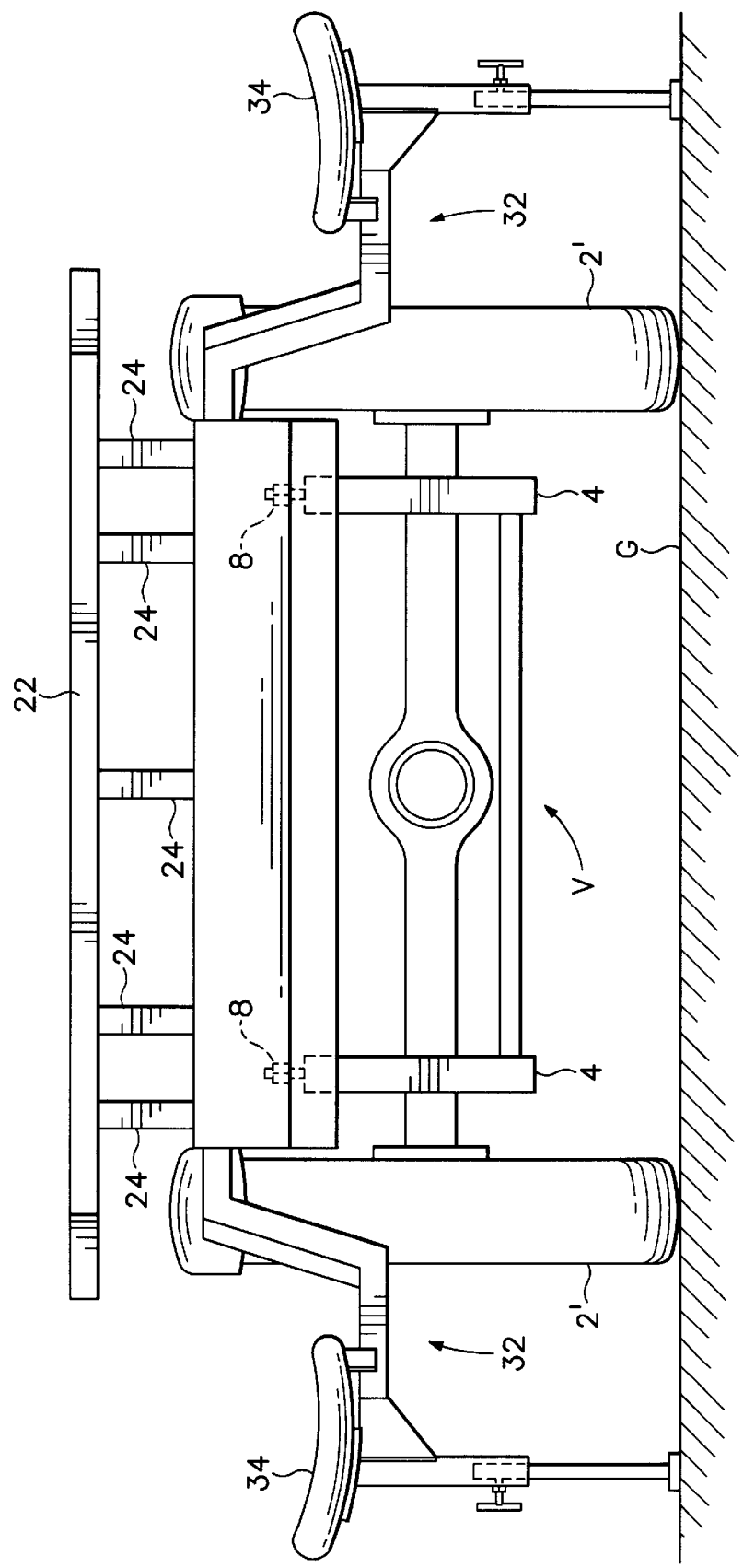
FIG. 9 is a rear end elevation of the counter and seating apparatus mounted in operative condition on a vehicle, mounting bolts securing the apparatus to the vehicle frame normally hidden from view being shown in broken lines.

In its basic form, the counter apparatus of this invention includes a countertop base support member which provides means for supporting the counter apparatus securely on the frame 4 of a vehicle. In the embodiment illustrated, this base support member is in the form of a framework 12 having front and rear frame members 14, 16 respectively and opposite side frame members 18, together forming a generally square or rectangular framework configured as needed for mounting on the rear end frame portion of a desired three-wheeled vehicle such as the one depicted in FIG. 1. Mounting means, illustrated herein as mounting bolts and nuts 8 (FIG. 9), is provided to interengage the framework 12 and vehicle frame 4 for securing the framework 12 to the underlying frame 4 of the vehicle. As will be apparent to those skilled in the art, the base support means and mounting means may be configured differently as needed for accommodating engagement with various different vehicle frame arrangements of different type and make of vehicle to be used. In the embodiment illustrated, the assembled framework 12 may also if desired include a centrally disposed storage area (not shown) accessed through an openable trunk lid 20 for storage convenience and additional versatility. Alternatively, the central area may be arranged to support and display the vendor's sale items, condiments and other accessories and products for sale.

Mounted on the rear end of the vehicle, the base framework 12 is preferably configured to extend laterally between the rear wheels of the vehicle and longitudinally to predetermined distances forwardly of and rearwardly of the rear axle of the vehicle. Positioned thusly, this framework 12 provides base support means for engaging and mounting an upstanding countertop arrangement and, in the preferred form of the invention, an outwardly projecting seating arrangement which will be described later.

As shown in the drawings, a countertop 22 is provided in any desired configuration such as the generally U-shaped configuration shown in the preferred embodiment. The countertop may be provided as a single, unitary member as shown or may alternatively be provided in separate sections that would be more convenient to handle and store if it is desired that the countertop be removed from the vehicle for any reason. In the illustrated embodiment, the countertop is dimensioned so as to provide an exterior peripheral countertop edge which extends laterally beyond the tires of the vehicle and longitudinally, in this embodiment, from the vehicle driver's seat to a point rearwardly of the rear end of the vehicle.

Countertop support means is provided for interengaging the countertop 22 and the counter base member framework 12 in this embodiment for supporting the countertop on the vehicle at a predetermined height above an underlying ground surface supporting the vehicle. One form of support means is shown herein wherein the underside of the countertop 22 mounts a plurality of downwardly extending support leg members 24 configured for mounting engagement on said base framework 12 for upstanding support of the countertop thereon. As seen best in FIGS. 7 and 8 of the drawings, the base framework 12 includes a plurality of recessed mounting sockets 26 configured to receive and engage the lower portion of each of said downwardly extending countertop support leg 24 for mounted support of the countertop assembly by the base framework.

As will be apparent to those skilled in the art it is preferable that the countertop assembly 22, 24 be secured in supported position on the framework against inadvertent dislodgement of the countertop when in use and when the vehicle is being operated for traveling between locations. In this regard the upstanding post members 24 may be permanently secured to the base framework 12 in any conventional manner such as by welding, etc., but preferably, the leg members are releasably secured to the base framework as by the threaded, friction clamp bolts 28 illustrated in FIGS. 7 and 8.

Figure 10:
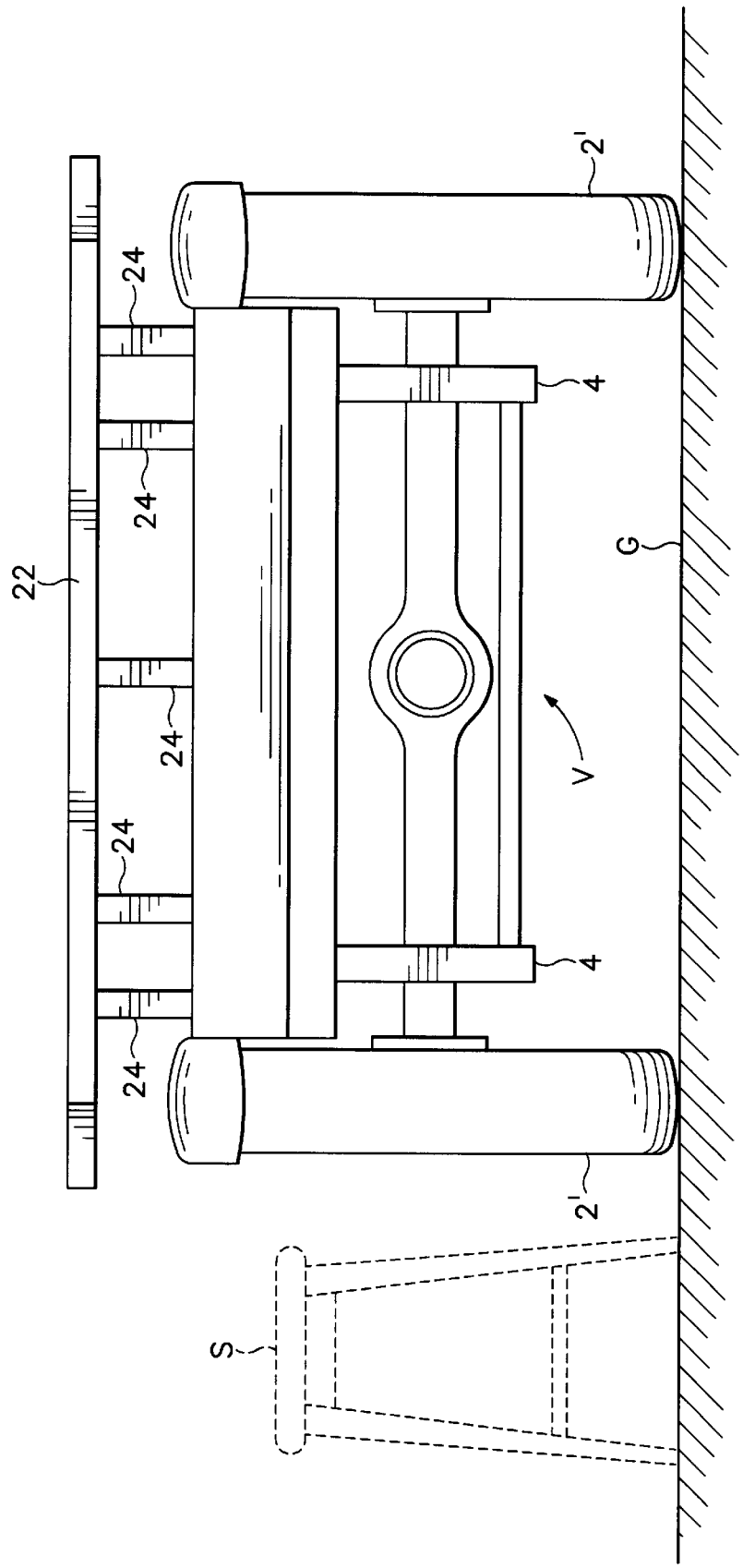
FIG. 10 is a rear elevation of another embodiment of the counter apparatus that does not include the seating apparatus of the preferred embodiment shown in FIGS. 1–9.
Figure 11:
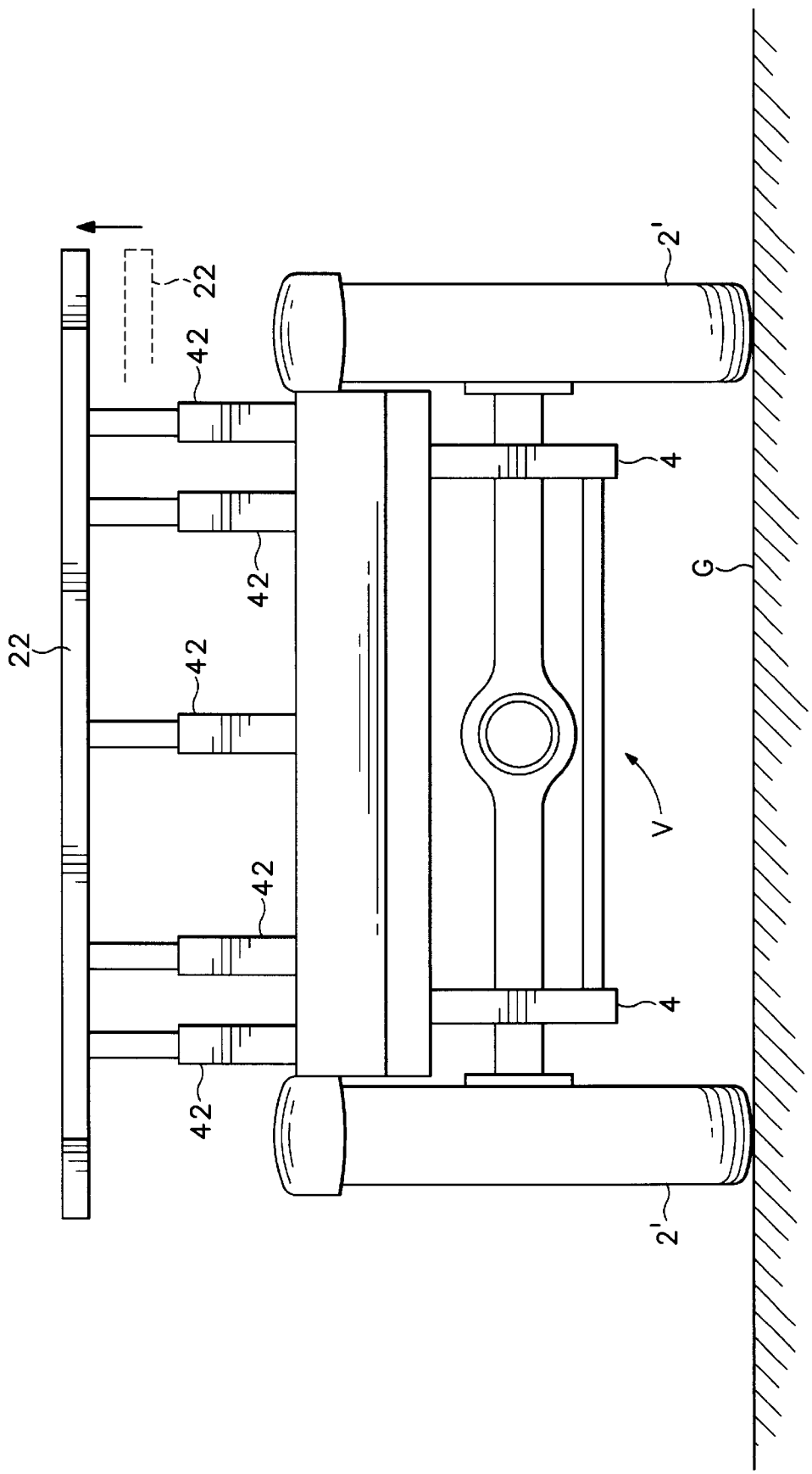
FIG. 11 is a rear elevation of another embodiment of the counter apparatus of FIG. 10 mounted on the vehicle to accommodate patrons standing about the periphery of the countertop.

The basic counter apparatus of this invention described thus far is best seen in FIGS. 10 and 11 wherein views of the rear end of a vehicle mounting the counter assembly show that, as in FIG. 10, the countertop may be supported on the vehicle at a predetermined height above an underlying ground surface G selected to comfortably accommodate a person sitting on a chair or stool S disposed on the underlying ground surface supporting the vehicle adjacent the sides and rear of the vehicle about the periphery of the countertop. FIG. 11 shows that the countertop may also if desired be alternatively supported on the vehicle at a predetermined height above ground selected to comfortably accommodate a plurality of patrons standing on the underlying ground surface about the periphery of the countertop. Such predetermined heights may (although not necessarily) be in the range of 26–33 inches above the underlying ground surface for a sitting height countertop surface level, and approximately 36–48 inches above the underlying ground surface for a standing countertop surface level. FIG. 11 also illustrates that the countertop support leg members may, if desired, be configured as telescopically extensible leg members 42 in order to selectively support the countertop 22 on the base frame 12 alternatively at desired, sitting or standing height above ground as will be understood.

Aside from providing means for operatively supporting the counter apparatus on the vehicle, the base support member (framework 12) also preferably provides mounting means for operatively mounting and supporting a plurality of seat members to the vehicle in operative condition extending outwardly of and generally about the periphery of the rear end of the vehicle and the eating countertop assembly. In the embodiment illustrated, the base framework 12 includes a plurality of second mounting socket members 30 (FIG. 7) in spaced apart condition about the periphery of the framework 12. These mounting sockets are configured to matingly receive and engage one terminal end 32' of a plurality of seat-mounting support members 32 each having an opposite, second terminal end portion 32" configured to mount seat members 34 at a predetermined height above an underlying ground surface supporting the vehicle and below the countertop 22 to accommodate use of the countertop surface by a person sitting on the seat member. The second socket members 30 include securing means associated therewith for releasably securing the seat support members 32 in secured engagement therein, as by friction clamp screws 28 similar to those previously described in connection with the countertop leg assembly.

The seat mounting support members 32 are dimensioned to position their seats 34 a predetermined distance outwardly of the periphery of the countertop assembly so as to provide a comfortable seating and eating arrangement. The members 32 further may be configured, as illustrated, with a drop down portion 33 intermediate the first and second terminal end portions 32', 32" configured to position the seat at a predetermined, appropriate sitting height above ground and relative to the countertop.

The counter base support member 12 may further provide means for stabilizing the vehicle and countertop/seating assembly against inadvertent and undesirable rocking and tilting on an underlying ground surface as patrons sit down upon and rise up from the seats. As will be understood, pedal-powered three and four-wheeled bicycles are generally rather narrow and rather lightweight and therefore would otherwise be quite susceptible to tipping movement upon a person sitting on one of the seats 34 projecting laterally from the vehicle. Motorized three and four-wheeled vehicles of course typically include a spring suspension system which also inherently allows for tilting movement of the vehicle and counter apparatus thereon which would be disadvantageous to the eating and seating arrangement of this invention. In the embodiment illustrated, stabilizer means is provided in the form of support leg members secured to the terminal end 32" of the seat mounting leg member 32 beneath its seat member 34. The support leg members illustrated comprise an outer downwardly depending tube member 36 configured to telescopically receive an inner leg member 38 as shown. With the seat mounting leg members 32 installed on the framework 12, the friction clamp bolt 40 is loosened to allow the lower, telescoping leg member 38 to drop to the underlying ground surface whereupon the clamp bolt 40 is re-tightened. With each seat assembly thus supported on the underlying ground surface, tilting and tipping movement of the vehicle and countertop/seating apparatus is clearly entirely eliminated. When out of service and when the vehicle is being driven from location to location, the seat assemblies may be removed from the base framework 12 and stored away or reinstalled on the framework 12 in the inverted condition shown in FIG. 8.

From the foregoing it will be apparent to those skilled in the art that the present invention provides for the increased utility of a three or four-wheeled, motorized or pedal-powered vehicle used as at least part of a mobile food vending arrangement, to the benefit and comfort of its patrons. Those skilled in the art will also recognize that the present invention, in its preferred form with its included seating apparatus, provides a mobile restaurant with an efficient eating and seating area while completely eliminating the need for carrying separate tables and chairs which must be packed and unpacked and setup and taken down and securely and safely stored as separate items on the vehicle when the mobile restaurant is out-of-service and in transit from place-to-place.

Also from the foregoing it will be apparent to those skilled in the art that various changes, other than those already discussed may be made in the size, shape, type, number and arrangement of parts described hereinbefore without departing from the spirit of this invention and the scope of the appended claims.

I claim:

1. An eating counter apparatus for use with a mobile vehicle having a base vehicle frame mounting at least one front ground-engaging wheel and a pair of laterally spaced-apart rear ground-engaging wheels, the base vehicle frame mounting an operators seat and vehicle operating station between said front and rear wheels and operator-controlled drive mechanism is supported on the vehicle frame for engaging and rotating at least one selected wheel of said ground-engaging wheels for controllably propelling said vehicle along an underlying ground surface supporting the vehicle, said eating counter apparatus comprising:
   a) a countertop base support member configured for support on a vehicle frame,
   b) means for interengaging said countertop base support member and a vehicle frame and mounting said countertop base support member thereon,
   c) an eating countertop member, and
   d) countertop support means for interengaging said countertop base support member and said eating countertop member and supporting said eating countertop member thereon in substantially horizontal condition overlying the vehicle at a predetermined height above an underlying ground surface supporting the vehicle mounting said countertop base support member for use of the vehicle-overlying eating countertop member by at least one person disposed alongside at least one lateral side of the vehicle.

2. The eating counter apparatus of claim 1 wherein said countertop support means releasably interengages said countertop member and said countertop base support member for releasable support of the countertop member thereon.

3. The eating counter apparatus of claim 1 including stabilizer means for releasably interengaging said countertop base support member and an underlying ground surface supporting a vehicle mounting said countertop base support member and supporting the countertop base support member and the countertop member supported thereon against movement during use of the eating countertop member.

4. The eating counter apparatus of claim 1 wherein said countertop base support member further mounts seating apparatus configured to mount at least one seat member in a predetermined position relative to said eating countertop member to dispose a person sifting on said at least one seat member for seated use of the eating countertop member.

5. The eating counter apparatus of claim 4 wherein said seating apparatus is configured for removable mounting on said countertop base support member.

6. The eating counter apparatus of claim 4 wherein said seating apparatus comprises a plurality of seat members mounted on said countertop base support member.

7. The eating counter apparatus of claim 4 including stabilizer means for releasably interengaging said countertop base support member and an underlying ground surface supporting a vehicle mounting said countertop base support member and supporting the countertop base support member and the countertop member supported thereon against movement when a person sits on said at least one seat member.

8. The eating counter apparatus of claim 7 wherein said stabilizer means comprising ground-engaging support leg members mounted on said seating apparatus substantially directly beneath each said at least one seat member of said seating apparatus.

9. The eating counter apparatus of claim 4 herein said seating apparatus comprises a plurality of seat-mounting leg members mounted on said countertop base support member for outward extension therefrom for positioning each said at least one seat member adjacent a vehicle mounting said eating countertop apparatus.

10. The eating counter apparatus of claim 4 including a separate, wheeled food preparation and service cart trailer arranged for releasable, towing attachment to a vehicle mounting said countertop base support member, the trailer for carrying, transporting and preparing food products to be provided to persons to consume at said eating countertop member while seated on said seating apparatus.

11. The eating counter apparatus of claim 1 including a separate, wheeled food preparation and service cart trailer arranged for releasable, towing attachment to a vehicle mounting said countertop base support member, the trailer for carrying, transporting and preparing food products to be provided to persons to consume at said eating countertop member.

12. An eating counter apparatus for use with a mobile vehicle having a base vehicle frame mounting at least one front ground-engaging wheel and a pair of laterally spaced-apart rear ground-engaging wheels, the base vehicle frame mounting an operator's seat and vehicle operating station between said front and rear wheels and operator-controlled drive mechanism is supported on the vehicle frame for engaging and rotating at least one selected wheel of said ground-engaging wheels for controllably propelling said vehicle along an underlying ground surface supporting the vehicle, said eating counter apparatus comprising:

a) a countertop base support member configured for support on a vehicle frame, b) means for interengaging said countertop base support member and a vehicle frame and mounting said countertop base support member thereon, c) an eating countertop member, and d) countertop support means for adjustably interengaging said countertop base support member and said eating countertop member for selectively supporting the countertop member at a first, lowered position supported at a first height above an underlying ground surface supporting a vehicle mounting the countertop base support member, and at a second, raised position in which said countertop member is disposed at a second, greater height above an underlying ground surface supporting a vehicle mounting the counter base support member.

* * * * *